United States Patent [19]
Morlion et al.

[11] Patent Number: 5,873,746
[45] Date of Patent: Feb. 23, 1999

[54] BACKPANEL CONNECTOR

[75] Inventors: Danny Morlion, St. Amandsberg; Jan Peter Karel van Koetsem, Zwiindrecht; Luc van den Torren, Bonheiden, all of Belgium

[73] Assignee: Framatome Connectors International, Courbevoie, France

[21] Appl. No.: 853,891

[22] Filed: May 9, 1997

[30] Foreign Application Priority Data

May 17, 1996 [NL] Netherlands .......................... 1003149

[51] Int. Cl.⁶ .................................................. H01R 13/74
[52] U.S. Cl. .......................................... 439/247; 439/248
[58] Field of Search ................... 439/248, 247, 439/701

[56] References Cited

U.S. PATENT DOCUMENTS

| 4,944,568 | 7/1990 | Danbach et al. | 439/248 |
| 5,228,865 | 7/1993 | Douty et al. | 439/247 |
| 5,605,150 | 2/1997 | Radons et al. | 439/247 |

FOREIGN PATENT DOCUMENTS

| 0 571 037 A1 | 11/1993 | European Pat. Off. |
| 0 602 726 A1 | 6/1994 | European Pat. Off. |
| 602726 A1 | 6/1994 | European Pat. Off. |

Primary Examiner—Hien Vu
Attorney, Agent, or Firm—Perman & Green, LLP

[57] ABSTRACT

A backpanel connector comprises a first and a second housing, wherein said first housing is provided with a bottom with an opening and four side walls upstanding from the bottom and lying opposite each other two by two and wherein said second housing is provided with four side walls lying opposite each other two by two. The second housing is slidably mounted in the first housing in a z-direction perpendicular to the bottom of the first housing and has a receiving space for a connector plug. Two opposite side walls of the second housing each carry a first stop means and two corresponding side walls of the first housing each comprise a second stop means. The stop means engage each other in a rest position of the second housing directed away from the bottom of the first housing. A spring means loads the second housing in the direction of the rest position.

7 Claims, 2 Drawing Sheets

BACKPANEL CONNECTOR

BACKGROUND OF THE INVENTION

The invention relates to a backpanel connector comprising a first and a second housing, wherein said first housing is provided with a bottom with an opening and four side walls upstanding from the bottom and lying opposite each other two by two and wherein said second housing is provided with four side walls lying opposite each other two by two, said second housing being mounted slidably in the first housing in a z-direction perpendicular to the bottom of the first housing, the second housing having a receiving space for a connector plug.

Such a backpanel connector is part of a backpanel connector system as described for example in a patent application of the same date of the same applicant. In a known connector system of this type the backpanel connector and the board connector comprise special provisions to guarantee that when disconnecting the plug connector from the backpanel connector the second housing is retracted into a rest position directed away from the bottom of the first housing by the board connector. In this known connector system the bottom of the first housing consists moreover of a separate bottom part which is attached to the first housing after mounting the second housing within the first housing. Thereby the known connector system is rather complicated.

SUMMARY OF THE INVENTION

The invention aims to provide an improved backpanel connector of the above-mentioned type.

To this end the invention provides a backpanel connector of the above-mentioned type, wherein two opposite side walls of the second housing each carry a first stop means and two corresponding side walls of the first housing each comprise a second stop means, wherein the stop means engage each other in a rest position of the second housing directed away from the bottom of the first housing and wherein a spring means is provided, said spring means loading the second housing in the direction of the rest position.

In this manner a backpanel connector is obtained wherein by a simple spring means it is always guaranteed that when the board connector is disconnected the second housing is located in the rest position. Manufacturing is also simplified whereas further the board connector can be simplified.

BRIEF DESCRIPTION OF THE DRAWINGS

The invention will be further explained by reference to the drawings in which an embodiment of the backpanel connector of the invention is shown.

DETAILED DESCRIPTION OF THE PREFERRED EMBODIMENT

Figure 1:
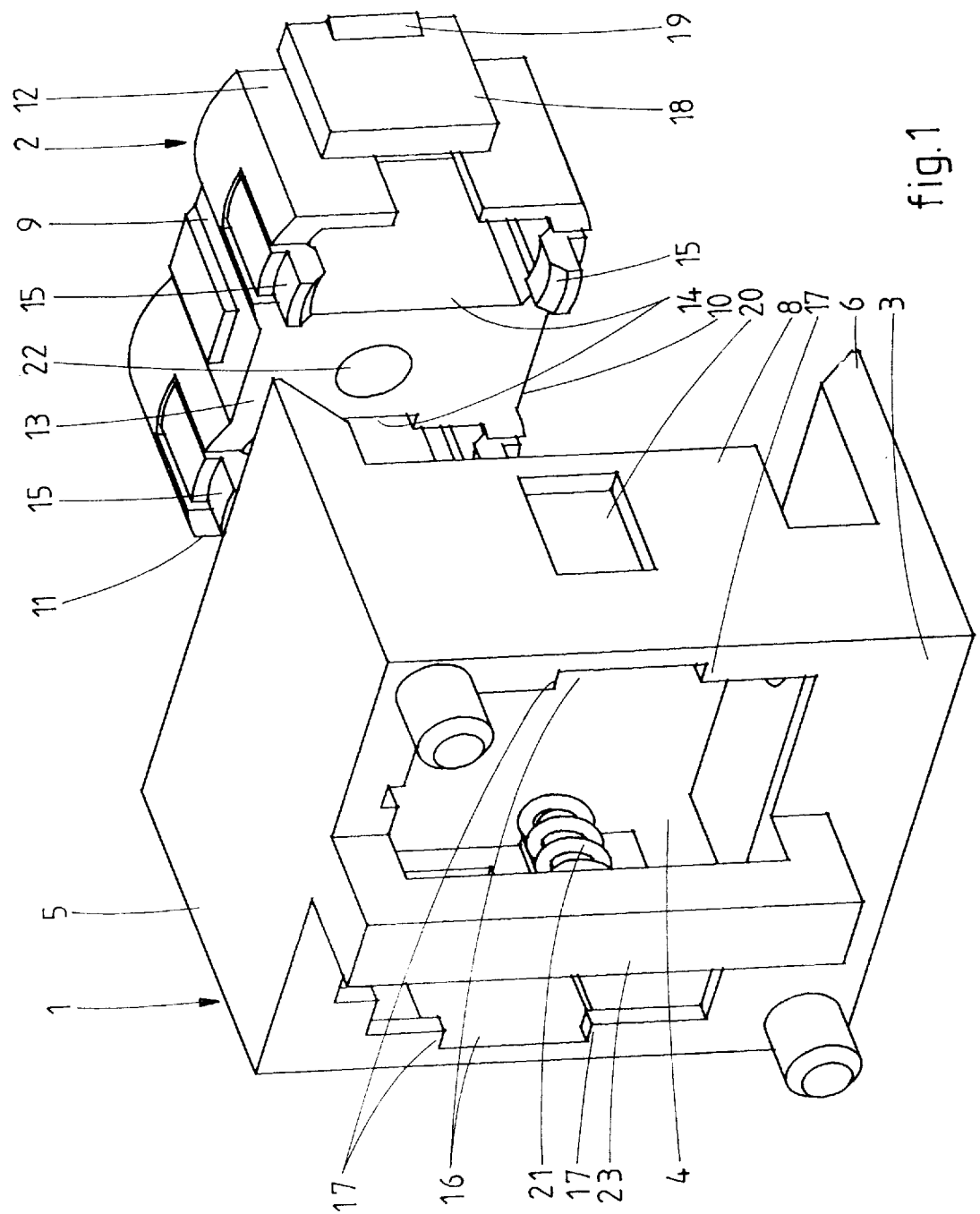
FIG. 1 shows an exploded view of an embodiment of the backpanel connector according to the invention.
Figure 2:
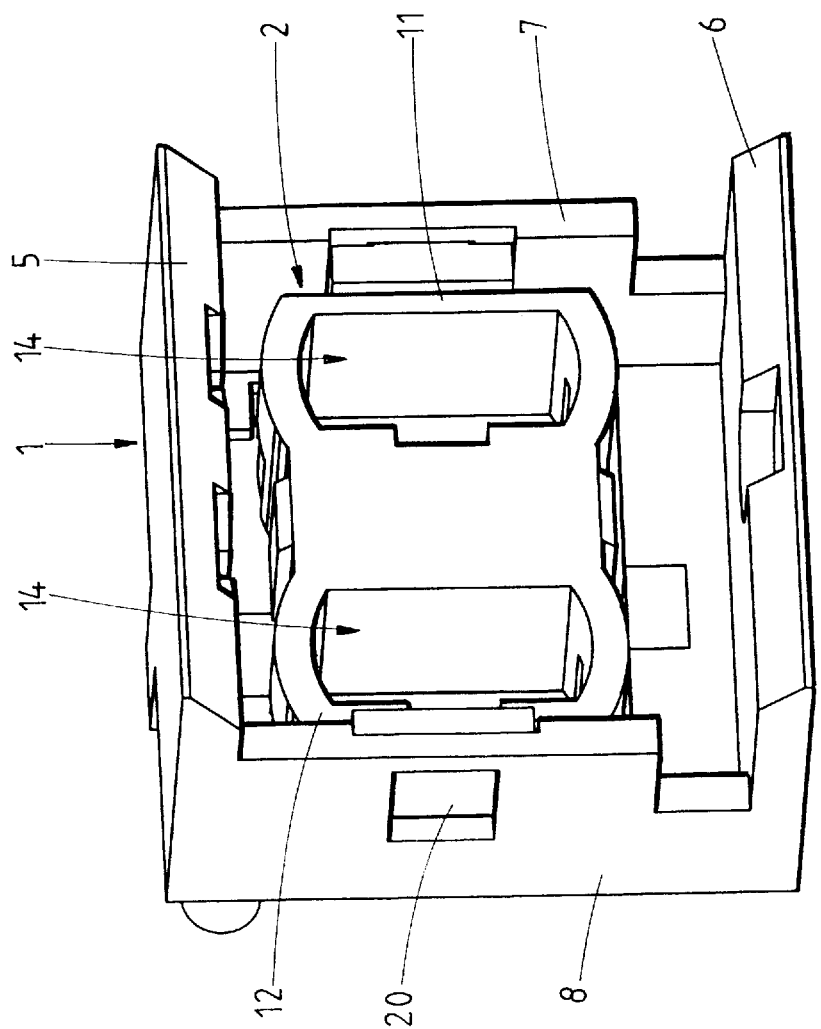
FIG. 2 is a perspective view of the backpanel connector of FIG. 1 as assembled.

FIGS. 1 and 2 show a backpanel connector adapted to cooperate with a board connector not shown and connector plugs not shown which are further described in a patent application Ser. No. 08/854,155 of the same date of the applicant which is deemed to be incorporated by reference. The backpanel connector comprises a first housing 1 and a second housing 2. The first housing 1 has a bottom 3 with an opening 4 and four side walls 5–8 upstanding from the bottom, wherein the side walls 5 and 6, and 7 and 8, respectively, are lying opposite each other two by two. The second housing 2 also has four side walls 9–12, the side walls 9 and 10, and 11 and 12, respectively, lying opposite each other two by two. Further, the second housing has a wide intermediate wall 13, which together with the further walls 9–12 determines two receiving spaces 14 for receiving a connector plug. The walls 9 and 10 carry at the location of each receiving space 14 locking fingers 15 for retaining an inserted connector plug as further described in an earlier patent application Ser. No. 08/854,155 of the applicant and reference is made to this application for a further explanation.

The second housing 2 is mounted slidably in the first housing 1 in a z-direction extending perpendicular to the bottom 3 of the first housing. For this purpose the walls 7, 8 of the first housing 1 each are provided with a slot 16 closed at least partially at the side of the bottom 3 by stop edges 17. At the side opposite the bottom 3 the slots 16 are open. Further, the walls 11, 12 each carry a guiding lug 18 which can be received with play in x- and y-directions in a corresponding slot 16. Further each lug 18 carries a projection 19 which snaps into a slot opening 20 when the housing 2 is pushed into the housing 1. The side of each projection 19 directed away from the bottom 3 determines as a first stop means together with the end edge of the corresponding slot opening 20 directed away from the bottom 3 as a second stop means a rest position of the second housing 2 in the first housing 1, in which rest position the second housing is located at its greatest distance from the bottom 3.

When the backpanel connector is assembled a spring means 21 made as spiral spring is received in a cavity 22 in the intermediate wall 13 of the second housing 2 and a carrier 23 for the spring means is provided on the bottom 3 of the housing 1. This spring means 21 exerts a spring force on the second housing 2 into the direction of the rest position. Thereby it is guaranteed that when the board connector is removed the second housing 2 will always be in the rest position.

Manufacturing of both the first and the second housing is relatively simply as both parts can be made as a unit. The second housing 2 can be mounted within the housing 1 in a very simple manner just by pushing the second housing 2 with the lugs 18 into the slots 16 of the first housing 1 until the projections 19 snap into the slot openings 20.

It is noted that in the specification and claims the x-, y- and z-directions indicate an orthogonal coordinate system.

The invention is not restricted to the above described embodiment which can be varied in a number of ways within the scope of the claims.

What is claimed is:

1. Backpanel connector comprising a first and a second housing, said first housing being provided with a bottom with an opening and four side walls upstanding from the bottom and lying opposite each other two by two, said second housing being provided with four side walls lying opposite each other two by two and with a receiving space for a connector plug, wherein the second housing is slidable between a rest position and an end position within the first housing in a mating direction perpendicular to the bottom of the first housing, wherein the rest position of the second housing is determined by first and second stop means, the first stop means comprising a projection being provided on two of said opposite side walls of the second housing and the second stop means comprising a slot opening being provided on corresponding ones of said opposite side walls of the first housing, wherein the first stop means engage the second stop means in the rest position of the second housing, and wherein a spring means is provided in the first housing, said spring means biasing the second housing in the direction of the rest position to try to maintain the first and second stop means engaged, wherein the bottom of the first housing is provided with a carrier extending outwardly therefrom for the spring means.

2. The connector according to claim 1, wherein said side walls of the second housing each comprise a guiding lug and said side walls of the first housing each have a slot provided with a stop edge at the bottom side of the first housing, a guiding lug of the second housing being received with play in x- and y-directions and slidably in a the mating direction.

3. The connector according to claim 2, wherein the guiding lugs each carry the projection as the first stop means and the slots each have the slot opening through the corresponding side walls of the first housing, the projection being received in said slot opening, wherein the end of said slot opening directed away from the bottom provides the second stop means.

4. The connector according to claim 3 wherein the slots in the side walls of the first housing are open at the side directed away from the bottom for inserting the guiding lugs of the second housing.

5. The connector according to claim 1, wherein the spring means is made as a spiral spring and wherein the second housing comprises a cavity for receiving the spring means.

6. The connector according to claim 5, wherein the second housing is provided with two receiving spaces for a connector plug.

7. The connector according to claim 6, wherein the cavity for the spring means is located between both said receiving spaces.

\* \* \* \* \*